Dec. 20, 1960 S. A. RADLEY 2,965,847
MEASURING SYSTEM
Filed Dec. 18, 1956 2 Sheets-Sheet 1

INVENTOR:
Sidney A. Radley
By Anthony D. Cennamo

Dec. 20, 1960  S. A. RADLEY  2,965,847
MEASURING SYSTEM
Filed Dec. 18, 1956  2 Sheets-Sheet 2

INVENTOR:
Sidney A. Radley
By Anthony D. Cennamo

United States Patent Office 2,965,847
Patented Dec. 20, 1960

2,965,847

MEASURING SYSTEM

Sidney A. Radley, Columbus, Ohio, assignor to Industrial Nucleonics Corporation

Filed Dec. 18, 1956, Ser. No. 628,999

3 Claims. (Cl. 328—225)

This invention relates generally to a nuclear measuring system and particularly to a new and improved electrometer circuit of the feedback amplifier type for use in such measuring system.

There are many applications in a variety of industries for instruments which render accurate, non-contacting measurement of material properties. This invention relates to the category of non-contacting instruments generally referred to as radiation thickness gauges of a general class of instruments which measure material properties by accurate determination of the relative quantities of radiation from a radiation source which are absorbed or reflected by the measured material. This class of instruments may be divided into two categories; transmission type gauges and reflection or "backscatter" gauges.

In a transmission gauge the material to be measured is placed between the radiation source and the radiation detector, so that a portion of the radiation energy emitted from the source in the direction of the detector is absorbed by the material. This energy absorption is dependent on the total number of electrons in the mass of material interposed between source and detector, so that the relative intensity of the radiation falling on the detector is a function of the weight per unit area, length or volume of the measured material. If a particular material is in the form of a sheet, of substantially uniform cross section, the response of the detector is an inverse function of its weight per unit area, and if the density of the material is known or constant the gauge may be calibrated in units of thickness. Hence, the term "thickness gauge" is derived.

The art has adapted this principle for gauging such variables as weight per unit length of rods, slivers, and the like; to measure wall thicknesses of materials such as pipe or other hollow or irregularly shaped objects; or, by confining the material to a given volume as in the case of a liquid flowing through a pipe, to determine its density.

In a reflection type gauge, the source and the detector are arranged on the same side of the material to be measured; the radiation beam is directed toward the material, and the detector receives and responds to the radiation reflected by the measured material. This reflection principle is very useful in a number of special applications. An example of this use is in an electroplating process where it is desired to measure a thin coating on a base metal; for instance, tin plate on steel. In this case the reflection characteristics of the base metal and the plating are different, so that if the base metal is of sufficient thickness to absorb or reflect substantially all radiation from the source, the gauge may be calibrated in units of weight per unit area (or thickness) of the plating metal. In a similar manner, the thickness of coatings such as paint on a metal surface may readily be gauged. In other applications, the thickness of paper, plastic films and the like can be gauged while passing over a metal roll which serves as the backer, or base reflector. The above examples illustrate typical instrumentation wherein the circuitry of this invention may be embodied.

A large impetus was given to the development of this general class of devices when artificially produced radioisotopes became available. The most important reason for this accelerated development was that one of two prime sources or error and instability in this type of gauge was almost automatically eliminated. Previously, in order to have a radiation source of a useable intensity and energy spectrum, with due consideration for personnel safety and economic feasibility, gauges were designed to utilize X-ray tubes. These devices, however are subject to various instabilities such that it is substantially impossible to depend on the exact reproducibility of the characterstics of the X-ray beam. This meant that there could be no basic reference within the instrument to which an original calibration of the instrument could be subsequently related. Therefore, if a measuring system, which is inevitably subject to various forms of drift and instability, is operated in conjunction with a radiation source which is also subject to drift and instability, the only available reference point for the readings of the instrument must be a "standard sample" or comparison sample of the material to be measured. Although this technique has been employed with fair success in some instances, notably in the metals industries, most other process materials are subject to dimensional instability, chemical instability, drying or moisture absorption and the like which make it impossible to preserve a "standard sample" for any length of time whatever. Furthermore, stable materials cannot usually be substituted as ersatz samples since their different radiation absorption characteristics lead to intolerable inaccuracies.

In the use of long-lived radioisotopes for gauging purposes, a suitable basic reference can be incorporated in the instrument itself as a result of the remarkably steady and constant radiation flux emitted by a nuclear radiation source; in which the radiation energy distribution remains constant, and which is inherently subject only to a slow, gradual decline in radiation intensity as the source decays according to its half-life scheme. This fact made it possible for the first time to contemplate the design of an instrument which would permanently retain an original calibration; a very large advantage considering the fact that the accurate calibration of a radiation gauge generally requires the specialized skill of a trained and experienced technician for a number of hours or several days depending on the nature of the application.

For a number of years, direct current amplifiers capable of response to minute currents on the order of a thousandth of a microampere or less have been utilized in ionization chamber type radiation monitoring instruments with considerable success. In such applications, extreme accuracy of measurement is not required, frequent recalibrations can be performed with facility, and with careful handling the delicate and specially designed electrometer tubes used in these instruments give good service in their intermittent and infrequent use.

The requirements of a practical industrial instrument are, however, much more stringent. In most instances, the trade demands an accuracy of 1% or better, in an instrument which can be routinely used on the production line with a minimum of attention and without any special training on the part of machine operators. It is highly desirable that the instrument should provide continuous measurement in accordance with settings of a permanent calibration, in spite of vibration, shock, ambient and local temperature variations, line voltage fluctuations and other adverse environmental conditions.

Early attempts to make use of the circuitry and laboratory type electrometer tubes employed in radiation monitoring instruments were markedly unsuccessful for a number of reasons, among which were the notable instability of direct current amplifiers and the delicacy and temperamental behavior of the above mentioned electrometer tubes.

Several drift-correction circuits had been proposed for the more or less continuous stabilization of D.C. amplifiers. These circuits are essentially similar in that by a vibrator or other periodically actuated switch means the input to the amplifier is periodically reduced to zero and the error voltage is thereupon amplified and returned by inverse feedback to the input, thereby biasing or loading the amplifier in a manner such that the error is substantially cancelled. While these amplifiers may be quite satisfactory in many applications, it was found that they are unable to function properly if at all where the input signal is such a minute current as is encountered in radiation measuring instruments of the ionization chamber type, since the loading introduced by the above mentioned inverse feedback will swamp the input signal. Furthermore the vibrator switch or other input zeroing means introduces an alternating current component into the amplified voltage, rendering the gauge output signals extremely difficult to utilize for purposes of recording or controlling by the usual type of electrical servomechanism designed to operate from a D.C. signal.

For such reasons, D.C. amplifiers were avoided by many workers in the development of this field of instrumentation, who preferred to modulate the D.C. signal from the ionization chamber and to design the measuring system around the resulting A.C. signal. However, instruments of this type necessitate frequent recalibration, and with the present availability of a variety of suitable nuclear radiation sources, any need for this particular system in the usual radiation gauging application has been eliminated.

It is accordingly an object of the present invention to provide a new and improved electrometer circuit for use in a radiation measurement system.

It is another object of this invention to provide a measuring system which is highly reliable and accurate; which will retain an absolute calibration indefinitely.

It is a further object to provide a D.C. amplifier which can utilize rugged industrial type electronic tubes and other commercially available circuit components, and which is simple and relatively inexpensive to produce and maintain.

It is a more specific object to provide such an amplifier which permits the replacement of an input tube with another having appreciably different grid current characteristics without the necessity for recalibrating the instrument.

It is another object of the invention to provide a D.C. amplifier with a means for balancing extreme voltages that may occur at the input thereof.

And, finally, it is another object to provide a feedback amplifier in which the need for a special reference voltage source is eliminated.

Other features and objects of the present invention will become readily apparent from a careful consideration of the following detailed description when taken in conjunction with the drawing in which.

Figure 1:
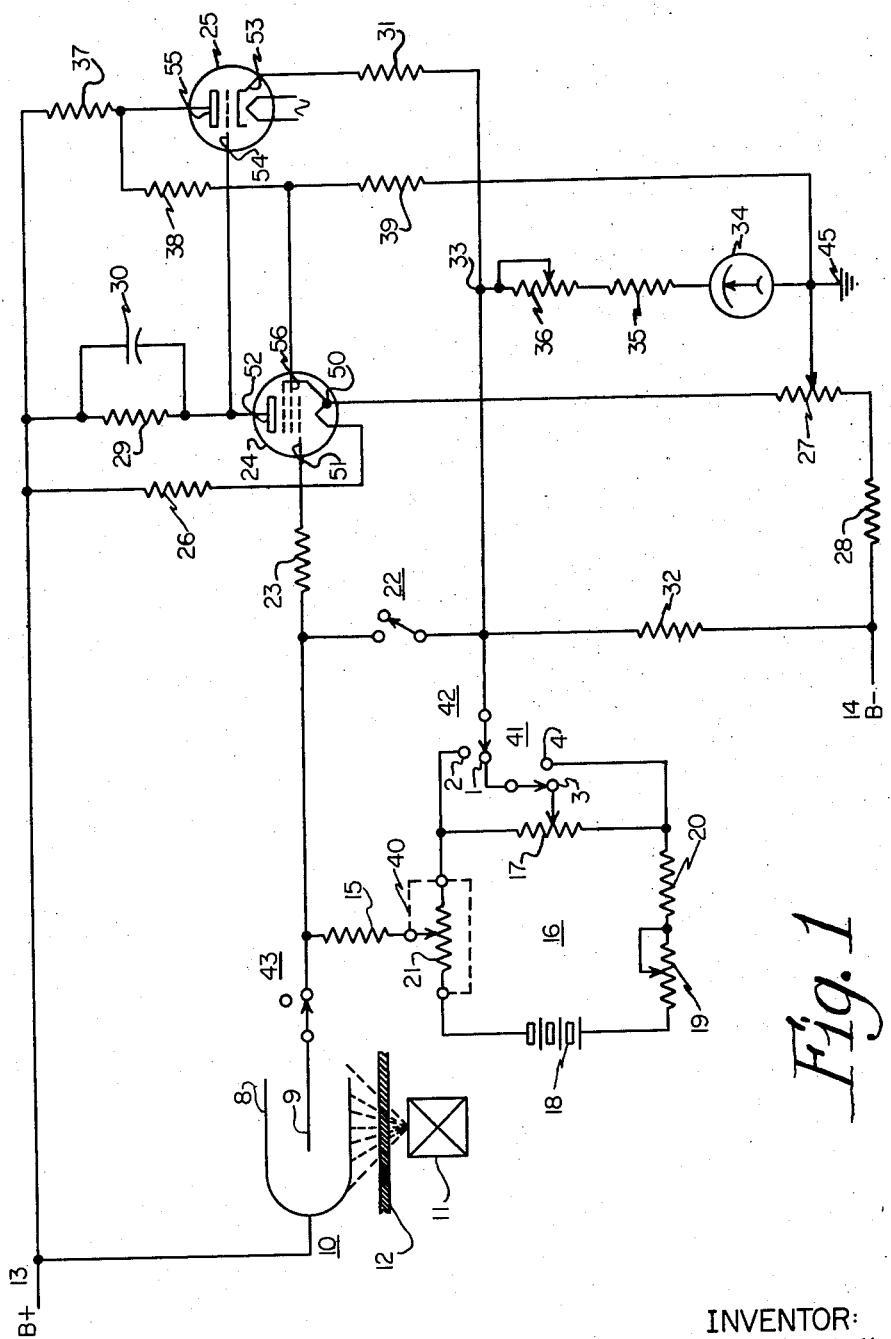
Figure 1 is a simplified schematic electrometer circuit diagram in a nuclear radiation gauge measuring system of the present invention.

Referring generally to Figure 1 there is shown an electrometer of the feedback amplifier type utilized in the present invention in a radiation measuring system. It will be understood hereinafter that by electrometer circuit is meant a vacuum tube circuit having a high input impedance and low grid current; and by feedback amplifier type is meant that the variation in the signal voltage is balanced out or compensated for rather than measured directly at the output thereof.

Referring now specifically to Figure 1, there is shown schematically in the circuit a radiation detector 10 receiving radiation from a source 11 after this radiation has been modified by interaction with the measured material 12. An electrical potential is supplied across the electrodes 8 and 9 of the detector from the high voltage direct current leads 13 and 14. In the well-known manner, the detector 10 functions as a high resistance whose impedance varies as an inverse function of the intensity of received radiation.

The circuit through the detector is completed in part by the resistor 15 which is of a very high impedance. Thus the minute currents flowing in the detector circuit are able to develop an appreciable voltage across resistor 15, and this voltage constitutes the signal input to the measuring system.

The measuring system includes an amplifier which comprises an electrometer stage utilizing tube 24 and a cathode follower stage utilizing tube 25, powered by the unidirectional voltage source represented by the leads 13 and 14 which also supply voltage to the detector 10.

The filament circuit 50 for the input tube 24 includes the dropping resistor 26, potentiometer 27 and resistor 28. The arm of potentiometer 27 is grounded at 45 whereas the power supply leads 13 and 14 are isolated from ground or alternately line 14 can be grounded and the arm of potentiometer 27 isolated from ground. Since the filament circuit 50, particularly resistors 27 and 28, is of a very low impedance relative to other circuitry in the system, an adjustment of potentiometer 27 fixes the operating potentials of the entire system with respect to ground, as well as establishing the grid bias for the electrometer tube 24. Line 14 operates at a negative potential, and line 13 at a positive potential, with respect to ground.

The plate 52 of tube 24 is connected to the control grid 54 of the cathode follower 25. The plate load resistor 29 is shunted by capacitor 30, so that the time constant of this resistor-capacitor combination functions as a stabilizer in the amplifier feedback loop by preventing large, instantaneous potential changes on the grid of tube 25, preventing spurious oscillations common to high gain amplifiers.

The cathode load resistance connected to cathode 53 for the output tube 25 comprises the voltage divider resistors 31 and 32. A junction or mid point such as at 33 between these two resistors operates near ground potential. Connected between point 33 and ground is the measuring indicator, represented as a meter 34, in series with resistor 35 and the meter sensitivity adjustment, potentiometer 36.

A plate resistor 37 connected to plate 55 is included in the circuit of the cathode follower 25. The potential on the plate 55 of this tube with respect to ground appears across the voltage divider combination of resistors 38 and 39. The portion of this vlotage which is present at the junction of resistors 38 and 39 is impressed on the screen grid 56 of tube 24, so that the screen grid voltage varies proportionately with variations in the plate voltage of tube 25. This positive feedback results in a large increase in the overall gain of the first tube of the amplifier.

The opposing voltage network 16, described in detail hereinafter, comprises a voltage source here represented as a battery 18, a standardizing potentiometer 19, a fixed resistor 20, and calibration potentiometer 17.

The grid current compensation feature of the present invention, also described in detail hereinatfer, provides a compensating potentiometer 21 and the switches 42 and 43 to facilitate the adjustment of the same.

Potentiometer 21 of very low resistance is inserted between the voltage source 18 and the potentiometer 17. The high resistance 15, whose one end is connected to the cathode 9 of the detector 10 and the grid 51 of the electrometer tube 24, has its other end connected to the wiper of the compensating potentiometer 21.

For purposes of explanation of the operation of the system of the persent invention assume that the instrument is a transmission type of thickness gauge. Accordingly the curve in Figure 2, to which reference may now be had, is an absorption curve which is a plot of the signal voltage developed across resistor 15 as a function of the weight per unit area of an absorber 12 placed between the source 11 and detector 10 of Figure 1. For any given measurement application, it is customary to select a source and detector combination which produces the most suitable absorption curve.

For example, on the same machine a manufacturer may produce material in the weight range from A to B, and also in the heavier range from C to D. It is evident that part of the radiation emission from the source must have sufficient energy to penetrate materials heavier than the weight D. At the same time, the radiation beam should be sufficiently attenuated by small increments of absorber weight to produce readily measurable changes in detector response.

It is impractical to calibrate the instrument so that the range of measurement extends over such a wide span of weights as from A to D. To illustrate, we may assume that the weight D is 500 mgm./cm.$^2$ (milligrams per square centimeter) the weight A is 100 mgm./cm.$^2$, and the radiation source is strontium 90—yttrium 90. Aside from other considerations, it is evident that if the instrument scale were to read from 100 to 500 mgf./cm.$^2$, a 1% weight variation in material weighing around 100 mgm./cm.$^2$, would represent only $\frac{1}{400}$ of the range of weights presented on the instrument scale.

This variation would scarcely be perceptible even on an 11 inch recorder chart. Therefore, the scale is calibrated over much more limited ranges, as from weight C to weight D. Thus a signal voltage variation of $E_c$ to $E_d$ must produce full scale deflection of the indicating system.

In calibrating the instrument the center position of the indicator corresponds to a center weight as at M, and the circuitry is arranged so that there is no signal into the amplifier when the weight of absorber is equal to M. An opposing voltage source indicated generally at 16 of Figure 1 is placed in series with the circuit of the resistance 15. By an adjustment of potentiometer 17 a portion of the voltage available from the source 18, here represented as a battery, can be made equal and opposite to any desired value, as $E_m$ of Figure 2, of voltage developed across resistor 15 as a result of the flow of detector current through resistor 15. Thus the operating point of the instrument is set so that an absorber weight M produces no signal into the amplifier; a weight less than M produces a net positive signal, and a weight greater than M produces a net negative signal; these signals being applied to the control grid of tube 24 through resistor 23 of Figure 1.

For the moment let us assume that potentiometer 21 is removed from the circuit. This condition may be simulated by imagining that a jumper, represented by the dotted line 40, is short circuiting potentiometer 21, so that the "bottom" of resistor 15 and the "top" of potentiometer 17 are at the same potential as the negative terminal of the battery 18. It can be seen that when the arm of potentiometer 17 is at the "top" of its travel as here shown, the output of the opposing voltage network is essentially zero. If at the same time there is no voltage being developed across resistor 15, the input to the amplifier is zero. This is the same condition which can be simulated at any time by closing the switch 22.

Figure 2:
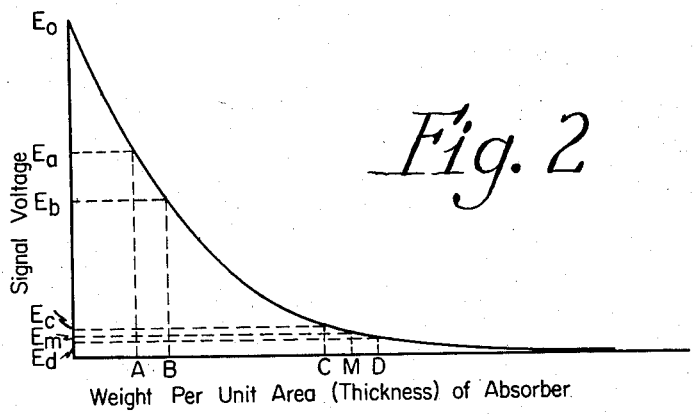
Figure 2 is a graph of a typical absorption curve illustrating the method of calibration and requirements of the circuit shown in Figure 1.

If the amplifier is "zeroed" as hereinafter described by closing switch 22 and adjusting potentiometer 27 until the meter 34 reads zero, the same zero reading now obtains with switch 22 open. Referring to Figure 2, it is observed that the condition simulated by closing switch 22 of Figure 1 is the condition where the absorber is so thick as to prevent any radiation from the source from reaching the detector, resulting in no signal voltage and a zero ordinate on the graph.

On the curve of Figure 2, the maximum ordinate $E_o$ corresponding to zero weight of absorber is obtained by removing the absorber 12 from the measuring gap so that the detector receives maximum radiation and the voltage developed across resistor 15 of Figure 1 is a maximum. The network 16 is arranged so that when the wiper of potentiometer 17 is at the "bottom" end of its travel there can be exactly sufficient opposing voltage from the network to cancel this maximum voltage across resistor 15. Accordingly, with the arm of potentiometer 17 set to the bottom limit of its travel, potentiometer 19 is adjusted until this cancellation is achieved exactly, this condition being when the meter 34 again returns to zero reading. The span of voltages available across potentiometer 17 now extends from zero volts to $E_o$ corresponding to the ordinate limits of the curve in Figure 2. Potentiometer 17 is a high precision component equipped with a dial which accurately divides this total voltage span into a number (usually 1000) of equal and arbitrary units.

An intermediate point on the absorption curve of Figure 2 can be located by placing a sheet of the material to be measured between source 11 and detector 10 of Figure 1 and adjusting potentiometer 17 until the meter 34 reads zero; cutting out of the sheet a sample of a known area which is approximately the size of the measuring area "seen" by the radiation gauge; accurately weighing the sample and calculating its weight per unit area, and plotting this weight per unit area against the reading of the calibrated dial on potentiometer 17 which is a measure of the gauge response. By repeating this procedure for a number of samples of different "thicknesses" the absorption curve can be determined.

Now if it is desired to set on the instrument a particular range of measurement as from C to D; from the graph of Figure 2 it can be determined what voltage $E_c - E_d$ in the above mentioned arbitrary units should cause the meter 34 to deflect full scale, and potentiometer 36 is adjusted until the meter does deflect full scale for that voltage change, which can readily be inserted by varying potentiometer 17 by that amount. From the graph, the potentiometer 17 dial setting $E_m$ which corresponds to the desired value of "thickness" M can be found directly.

Typically the voltage $E_o$ obtained across the resistor 15 is around 10 volts. The voltage variation $E_c - E_d$ representing weight variations from C to D may therefore be one volt or less. Since the normal variations in the measured process are only a few percent of the total weight range presented on scale, the normal voltage variation to which the amplifier must respond may be in the range of a few millivolts. On the other hand, consider the condition that obtains if there is an occurrence such as a sheet break, or other event common in an industrial process, which causes the absorber to be suddenly removed from the measuring gap. The potential at the input of the measuring system will suddenly rise to a positive value of $E_o$. Evidently if this voltage were allowed to be impressed on the grid of the tube 24 the severe shock to the tube would be disastrous. Hence the necessity for the system of inverse feedback in the amplifier which will now be described.

The switch 22, which may be the contacts of a relay, is provided for initially adjusting the amplifier to obtain the condition of no output for no input. It also facilitates the periodic adjustments which are performed to compensate the amplifier for long term drifts. When closed, switch 22 eliminates all input voltage to the amplifier by short-circuiting the high impedance resistor 15 and the opposing voltage source 16. The condition that should now obtain is that no current should flow in the circuit of the meter 34, so that the needle is centered on scale. This is the case when the voltage developed across resistor 32 is equal to the voltage developed across resistor 28 and the negative end-portion of potentiometer 27. It can be seen that the bias on the grid 51 of the tube 24 is affected by an adjustment of potentiometer 27. This determines the current flow through tube 24 which in turn determines the potential on the grid 54 of tube 25, thereby regulating the current through the latter tube and resistor 32. It is apparent that a very small change in the grid voltage of tube 24 will produce a large change in voltage across resistor 32. It is further apparent that the voltage change so produced appears at point 33 with a polarity which tends to oppose and cancel the voltage change on the grid of tube 24. However, the adjustment of potentiometer 27 determines the reference value for the voltage at point 33 and the grid 51 of tube 24 with respect to the filament-cathode voltage. Hence, by this means the point 33 and the grid of tube 24 are brought to ground potential so that no voltage appears across the meter circuit. The filament-cathode 50 of tube 24 is at a slightly more positive potential determined by the portion of the voltage drop across potentiometer 27 which is between the wiper and the filament. This is of course the same as stating that the proper value of negative bias with respect to the filament-cathode 50 is established on the grid 51 of the tube.

When switch 22 is open, an input voltage may be impressed on the amplifier. This signal will be the difference between the voltage developed across resistor 15 as a result of detector current through it, and the opposing voltage from the network 16. Assuming that the net signal on the grid 51 of the electrometer 24 becomes positive, the current through this tube will increase, with the result that its plate voltage will fall to a more negative potential. This negative-going voltage is impressed on the grid 54 of the cathode follower 25, resulting in decreased current flow through this tube and resistor 32. Thereupon the point 33 becomes more negative. This negative potential, acting through the network 16 and resistor 15, substantially cancels the positive signal which would otherwise be impressed on the grid 51 of tube 24, allowing this grid to assume only a sufficient positive voltage increase to maintain the necessary feedback voltage. The reverse action occurs for the case of a negative-going signal. It is apparent from the foregoing that in the event the absorber is removed from the measuring gap, the extreme voltage that would have been impressed on grid 51 of tube 24 is balanced out.

Figure 3:
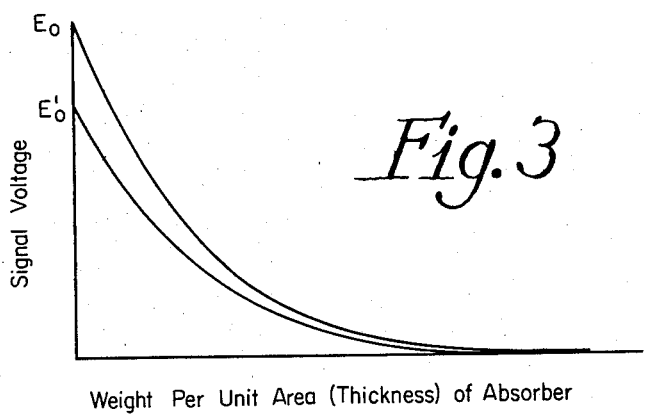
Figure 3 is a graph illustrating the characteristics of source-type drift in a nuclear radiation gauge.

The effect of source decay is illustrated in Figure 3, whereon there is shown an absorption curve with a maximum ordinate $E_o$ corresponding to zero weight of absorber, and a second curve with a maximum ordinate $E_o'$. This second curve is the typical result of decay of the radiation source over a period of time.

The decay characteristics of a given radioisotope are such that the relative proportions of decay particles given off at various energies does not change with time; and although there is a gradual reduction in the number of particles, their distribution on the continuum of energies remains constant. Therefore, on the curve whose maximum ordinate is $E_o'$, all ordinates have been decreased by exactly the same percentage from the original value. Hence the term "source drift" is applied to any error-producing variable with this proportional effect, whether the error is in the same direction as that produced by source decay or in the opposite direction, as would be the case if the output of the voltage source 18 were to be decreased.

Source-type drifts can be corrected by throwing the switch 41 of Figure 1 to connect the point 33 to the junction (position 4) of resistor 20 and potentiometer 17, and adjusting the standardized potentiometer 19 until the meter 34 reads zero. In the example shown in Figure 3, it can be seen that this adjustment restores the original shape of the curve by establishing a new voltage value for each arbitrary unit on the ordinate axis of the graph. The provision of switch 41, which may be the contacts of a relay in an automatically standardizing system, makes it unnecessary to disturb the setting of potentiometer 17 in order to reestablish the value of $E_o$, since the voltage at the junction 17 and 20 is substantially equivalent to the maximum voltage setting of the wiper of potentiometer 17.

Figure 4:
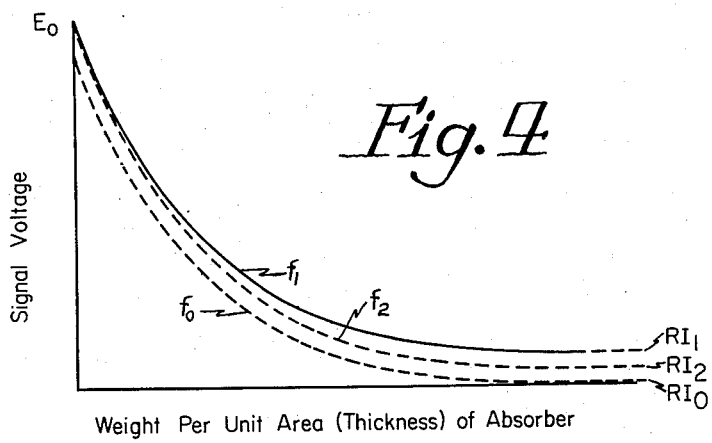
Figure 4 is a family of absorption curves illustrating the grid current compensation concept of the present invention.

Although a shift in the grid current characteristics of a tube in service, in a properly designed instrument, is an infrequent occurrence, prior to this invention it has been a considerable problem due to the fact that tube failures are to be expected in all types of electronic equipment. The consequences of a necessity for an electrometer tube replacement in these prior instruments is illustrated in Figure 4. Here it is assumed that an instrument has been accurately calibrated on the basis of the curve $f_1$, which has been established while operating with an input tube having a grid current $I_1$. The reference point for the voltage response of the instrument is essentially the product of the resistance 15 and the grid current; i.e., $RI_1$.

However, upon replacing the input tube with another having a grid current $I_2$, the curve is displaced vertically downward a distance $(RI_1-RI_2)$. Upon standardizing the instrument, the reference point $E_o$ is restored, but since the bottom of the curve is now tied down to the ordinate value $RI_2$ instead of $RI_1$, the shape of the curve has been altered to $f_2$, so that the gauge reads in error and would require recalibration. To insure against such an occurrence, which often means an expensive and time consuming recalibration procedure during which the gauge is out of service, it has been the custom to subject these electronic tubes to a rigid pre-testing operation to make certain that all original tubes as well as stock replacements possess grid current characteristics within very narrow limits of acceptability. As a result, it has been necessary to discard a very high percentage of new and unused tubes; an expensive procedure, particularly in the cigarette or textile industries where several hundred instruments may be required in a single manufacturing plant. To overcome these difficulties the present invention provides a grid current compensation network comprising a compensating potentiometer 21 and the switches 42 and 43 to facilitate the adjustment of the same.

Potentiometer 21, of very low resistance, is inserted between the voltage source 18 and the potentiometer 17. The high resistance 15, whose one end is connected to the cathode 9 of the detector 10 and the grid 51 of the electrometer tube 24, has its other end connected to the wiper of the compensating potentiometer 21. The resistance of potentiometer 21 is inserted in the opposing voltage network to provide a small voltage drop between the negative terminal of the voltage source 18 and the "zero" or low voltage end of the center scale potentiometer 17. With the proper setting of potentiometer 21, a portion of this voltage drop is applied across the input of the measuring system as a substantially constant signal input which is equal and opposite to the signal developed across resistance 15 as a result of grid current therethrough. It will be readily appreciated that potentiometer 21 in the opposing voltage network serves in this particular instance only as a variable potential source and other means of providing this source is apparent.

The proper setting of potentiometer 21 is determined by opening the circuit to the detector, as by the switch 43, to eliminate the detector circuit as a signal source; by throwing the switch 42 to position No. 2 to eliminate the "center scale" potentiometer as a signal source; and then adjusting potentiometer 21 to effect the necessary grid current compensation which is indicated when the meter 34 reads zero. The circuits in which changes were brought about as by the use of switches 42 and 43 can now be restored to normal condition, with the setting of potentiometer 21 fixed in position, since it is normally unnecessary to change the compensating adjustment throughout the life of the tube 24.

By performing the compensating adjustment before the gauge is calibrated, it is insured that the subsequently established calibration curve is plotted with respect to a substantially true condition of zero signal input, and furthermore this condition can be duplicated at any time regardless of the fact that a replacement tube may possess a significantly different grid current characteristic.

From this brief explanation it will be apparent to one skilled in the art that there is no voltage amplification in the system; that the grid of the electrometer tube remains very near ground potential at all times regardless of changes in signal input; that the voltage across the meter circuit from point 33 to ground follows the voltage variations across the resistance 15 with reversed polarity but substantially equal magnitude; that the amplification system is the means of transforming an extremely high impedance signal into a low impedance signal for operating the read-out device, and that the impedance match is accomplished without any signal distortion of a type which could adversely affect the desired end result; i.e., accurate and continuous measurement with adequate speed of response.

It will be also apparent that meter 34 is inserted in the circuit for purposes of simplicity and could be any other type of indicator. Further, meter 34 could be replaced by a utilization circuit for other purposes, such as, an automatic controller for controlling the thickness of the material 12 being gauged.

Although a certain specific electrometer circuit having utility in a radiation type thickness measurement gauge is illustrated and described it is to be expressly understood that many modifications are possible thereof and its utility in other applications may be had without departing from the true spirit of the invention.

What is claimed is:

1. A system for measuring a variable characteristic, comprising a transducer characterized by an impedance which varies in accordance with a function of said characteristic, an energizing voltage source, a signal impedance in circuit with said transducer and said energizing voltage source for developing a signal voltage proportional to said transducer impedance, an opposing voltage source providing a voltage opposing said signal voltage, an amplifier responsive to any difference between said signal voltage and said opposing voltage, means for short-circuiting the input of said amplifier, adjustable means for biasing said amplifier to provide zero output therefrom when said input is short-circuited, means for disconnecting said transducer from said system, means for reducing said opposing voltage to zero, and an adjustable compensating voltage source in circuit with said signal impedance and said opposing voltage source to provide a compensating bias voltage to said amplifier input, said bias voltage being adjusted to produce zero output from said amplifier when said opposing voltage is zero and said transducer is disconnected.

2. A system as in claim 1 wherein said opposing voltage source and said compensating voltage source consist of a single two-terminal network comprising a primary voltage source, a pair of series connected potentiometers in circuit with said primary voltage source, and a rheostat in circuit with said primary voltage source for regulating the potential across said potentiometers; each terminal of said two-terminal network consisting of a variable tap on one of said potentiometers.

3. A system as in claim 1, wherein said amplifier comprises first and second electronic devices each having electron emitter and electron collector discharge electrodes bounding an electron discharge path and a control electrode for regulating the flow of electrons between said discharge electrodes, a bridge circuit having first and second arms in parallel connection across a unidirectional power supply for said amplifier; said first arm comprising a voltage divider impedance having first and second potentiometer taps separated by a portion of said impedance, said first tap being connected to one of said discharge electrodes of said first electronic device and one of said taps being a variable potentiometer tap; said second arm comprising said discharge electrodes of said second electronic device and an impedance having an intermediate tap, and a load impedance connecting said second potentiometer tap to said intermediate tap; wherein said control electrode for said first electronic device and said intermediate tap compose the input terminals of said amplifier and said second potentiometer tap and said intermediate tap compose the output terminals thereof.

References Cited in the file of this patent

UNITED STATES PATENTS

| 2,323,626 | Sherfield | July 6, 1943 |
| 2,492,542 | Stone | Dec. 27, 1949 |
| 2,647,214 | Penny | July 28, 1953 |
| 2,790,945 | Chope | Apr. 30, 1957 |
| 2,829,268 | Chope | Apr. 1, 1958 |

OTHER REFERENCES

Law: "Electrical Measurements," McGraw Hill, 1938, pages 252–253, 257–260.

Penick: "Direct Current Amplifier Circuits for Use with the Electrometer Tube," Review of Scientific Instruments, vol. 6, pages 115–120, April 1935.

Ramsay et al.: "A Circuit for the Analysis of Seiger-Counter Pulser," Review of Scientific Instruments, vol. 6, pages 121–125, April 1935.